US010030380B2

United States Patent
Merrick et al.

(10) Patent No.: US 10,030,380 B2
(45) Date of Patent: Jul. 24, 2018

(54) CONCRETE SLAB ANCHOR

(71) Applicant: ToolTech, LLC, Phoenix, AZ (US)

(72) Inventors: Jake Merrick, Hinton, OK (US); Lucas Taylor, Philadelphia, PA (US)

(73) Assignee: TOOLTECH, LLC, Phoenix, AZ (US)

( * ) Notice: Subject to any disclaimer, the term of this patent is extended or adjusted under 35 U.S.C. 154(b) by 68 days.

(21) Appl. No.: 15/355,239

(22) Filed: Nov. 18, 2016

(65) Prior Publication Data
US 2017/0145684 A1 May 25, 2017

Related U.S. Application Data

(60) Provisional application No. 62/258,213, filed on Nov. 20, 2015.

(51) Int. Cl.
*F16B 13/06* (2006.01)
*E04B 1/41* (2006.01)

(52) U.S. Cl.
CPC .......... *E04B 1/4114* (2013.01); *E04B 1/4121* (2013.01); *F16B 13/06* (2013.01)

(58) Field of Classification Search
CPC .... F16B 13/06; F16B 13/066; F16B 13/0858; F16B 13/0866; E04B 1/4114; E04B 1/4121
USPC ................ 411/44, 49, 57.1, 60.3, 65, 71, 73
See application file for complete search history.

(56) References Cited

U.S. PATENT DOCUMENTS

| | | | | |
|---|---|---|---|---|
| 1,035,277 A | * | 8/1912 | Veres | F16B 13/066 411/53 |
| 2,570,003 A | * | 10/1951 | Palmer | E21D 21/008 405/259.3 |
| 3,175,455 A | * | 3/1965 | Reddy | F16B 13/066 220/235 |
| 4,052,925 A | * | 10/1977 | McCarthy | F16B 13/065 411/60.3 |
| 4,195,547 A | * | 4/1980 | Giannuzzi | F16B 13/045 411/54 |
| 4,861,197 A | * | 8/1989 | Calandra, Jr. | E21D 21/0026 405/259.3 |

(Continued)

FOREIGN PATENT DOCUMENTS

| | | |
|---|---|---|
| WO | 2014127223 A1 | 8/2014 |
| WO | 2014127228 A1 | 8/2014 |

(Continued)

*Primary Examiner* — Roberta S Delisle
(74) *Attorney, Agent, or Firm* — Bracewell LLP; James E. Bradley

(57) ABSTRACT

A concrete anchor has a body with cam surfaces. Each of the cam surfaces curves outward from a first edge to a second edge. The cam surfaces have a circumscribed outer diameter that increases in a downward direction. Jaws are retained around the body, each of the jaws having an inner side in engagement with one of the cam surfaces. Each of the jaws decreases in radial thickness in a downward direction. Cam ratchet teeth on each of the cam surfaces engage jaw ratchet teeth on the inner side of each of the jaws. The jaw ratchet teeth ratchet over the cam ratchet teeth as the body rotates in a first direction to move the jaws from a contracted position to an expanded position. The engagement of the cam and jaw ratchet teeth prevent rotation of the body relative to the jaws in the opposite direction.

20 Claims, 9 Drawing Sheets

(56) References Cited

U.S. PATENT DOCUMENTS

| | | | |
|---|---|---|---|
| 8,579,568 B2* | 11/2013 | Wenfeng | A47K 13/26 411/57.1 |
| 8,870,507 B1* | 10/2014 | Larson | F16B 2/14 411/354 |
| 8,955,414 B2 | 2/2015 | Merrick | |
| 8,997,608 B2 | 4/2015 | Merrick | |
| 9,132,531 B2 | 9/2015 | Merrick | |
| 9,138,873 B2 | 9/2015 | Merrick | |
| 9,278,434 B2 | 3/2016 | Merrick | |
| 2002/0054805 A1* | 5/2002 | Kaibach | F16B 13/065 411/60.1 |
| 2007/0098518 A1* | 5/2007 | Rosenkranz | F16B 13/066 411/60.2 |
| 2012/0311947 A1* | 12/2012 | Van Wissen | F16B 13/066 52/250 |
| 2013/0202364 A1* | 8/2013 | Ikuno | E21D 21/008 405/259.3 |
| 2014/0224084 A1 | 8/2014 | Merrick | |
| 2015/0231773 A1 | 8/2015 | Merrick | |
| 2015/0343613 A1 | 12/2015 | Merrick | |
| 2015/0343615 A1 | 12/2015 | Merrick | |
| 2015/0343624 A1 | 12/2015 | Merrick | |

FOREIGN PATENT DOCUMENTS

| | | |
|---|---|---|
| WO | 2014127233 A1 | 8/2014 |
| WO | 2014127237 A1 | 8/2014 |
| WO | 2014127239 A1 | 8/2014 |

* cited by examiner

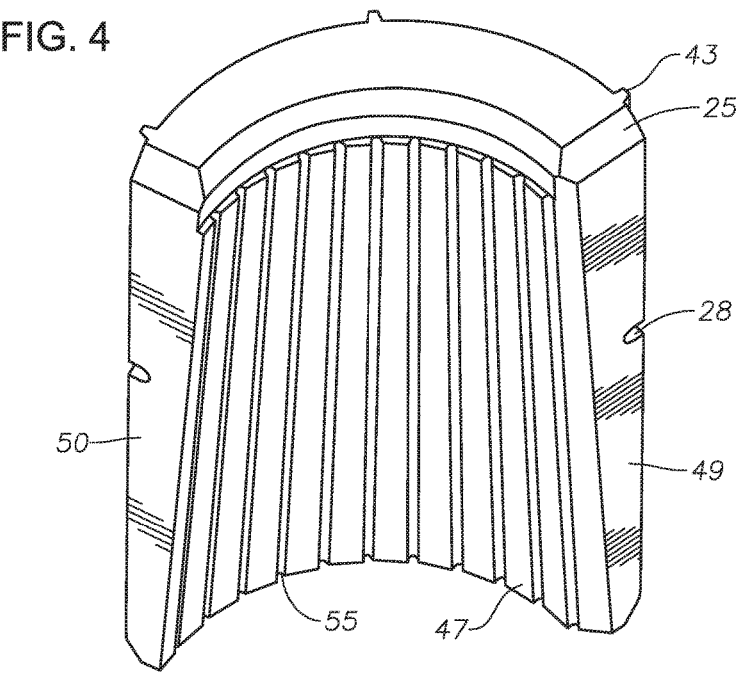
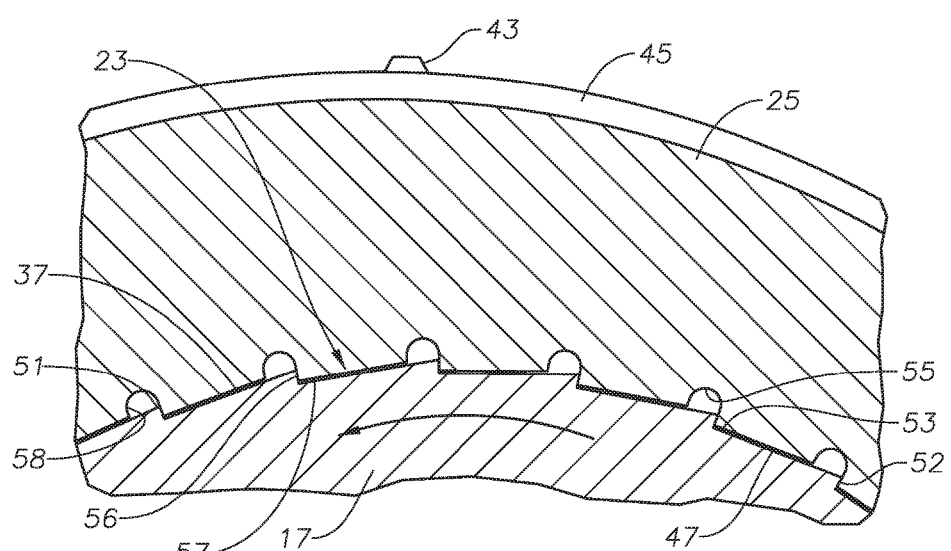

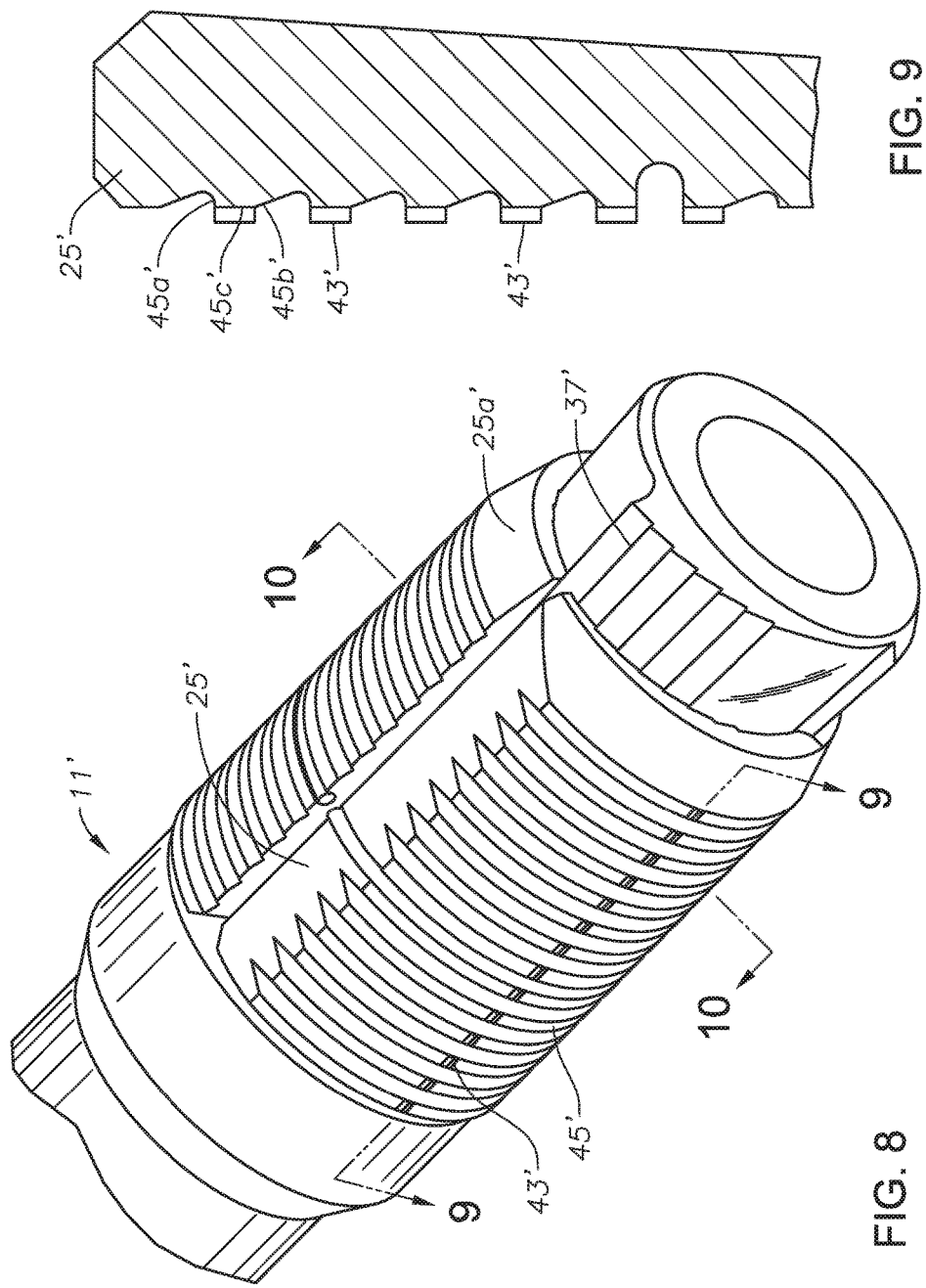

US 10,030,380 B2

CONCRETE SLAB ANCHOR

CROSS REFERENCE TO RELATED APPLICATION

This application claims priority to provisional application Ser. No. 62/258,213, filed Nov. 20, 2015.

FIELD OF THE DISCLOSURE

This disclosure relates in general to threaded fasteners and in particular to an anchor that secures in a hole in a concrete slab and has an upper threaded section for securing a building component, such as stud, to the concrete slab.

BACKGROUND

Buildings are often built by first pouring a slab of concrete. In one technique, holes are formed at locations where building components, such as studs, are to be attached. Various types of anchors are secured in the holes. The anchors have threaded upper ends protruding above the slab. The building component to be attached has a hole for the upper end of the anchor, enabling the threaded upper end to protrude above a part of the building component. A worker will secure the building component to the slab with a nut tightened to the threads.

Some types of anchors are difficult to install. Also, at times, an anchor can come loose from gripping engagement with the sidewall of the hole.

SUMMARY

The device disclosed has a body with a lower portion, an upper portion, and a longitudinal axis. A downward facing shoulder is located at a junction of the upper portion with the lower portion. A plurality of cam surfaces are formed on the lower portion of the body, each of the cam surfaces curving outward from a first edge at a first radial distance to a second edge at a second radial distance relative to the axis that is greater than the first radial distance. Each of the cam surfaces has an upper end adjacent the downward facing shoulder. The cam surfaces have a circumscribed outer diameter that increases in a downward direction from the downward facing shoulder. A plurality of jaws are retained around the lower portion. Each of the jaws has an inner side in engagement with one of the cam surfaces. Each of the jaws decreases in radial thickness from the inner side to an outer side measured from an upper end to a lower end of each of the jaws. The outer sides of the jaws define a circumscribed outer diameter for the jaws that is the same from the upper ends to the lower ends of the jaws. An increment of rotation of the body in a first direction relative to the jaws causes the circumscribed outer diameter of the jaws to increase and the jaws to move from a retracted to an expanded position, enabling the jaws to grip a sidewall of the hole.

The body has an outer diameter at the downward facing shoulder that is the same as the circumscribed outer diameter of the jaws while the jaws are in the retracted position. An array of protuberances on the outer sides of the jaws grip the sidewall of the hole. The protuberances may include at least one axially extending ridge protruding from the outer side of each of the jaws, and at least one circumferentially extending rib protruding from the outer side of each of the jaws.

Alternately, the protuberances may include an array of circumferentially extending ribs protruding from the outer side of each of the jaws. Each of the ribs may have an upward facing flank and a downward facing flank joined by a crest, the upward facing flank inclining more relative to the axis than the downward facing flank. A protuberance may protrude from each of the ribs, the protuberance may have a lesser circumferential dimension than a circumferential length of each of the ribs.

The device may have a set of threads formed on the upper portion of the body. A polygonal drive head is also formed on the upper portion of the body.

In the embodiments shown, the device has a set of cam ratchet teeth formed on each of the cam surfaces. A set of jaw ratchet teeth are formed on the inner side of each of the jaws. The jaw ratchet teeth are configured to engage and ratchet over the cam ratchet teeth as the body rotates from the retracted to the expanded position. The engagement of the cam and jaw ratchet teeth prevent rotation of the body relative to the jaws from the expanded position to the retracted position.

The jaws may be retained by an expansible ring encircling the jaws to retain the jaws on the body. The ring may be a split ring. Alternately, flexible links may join adjacent side edges of the jaws.

BRIEF DESCRIPTION OF THE DRAWINGS

FIG. 4 is a perspective view of the inner side of one of the jaws of the anchor of FIG. 1.

FIG. 5 is an enlarged sectional view of a portion of one of the jaws and a portion of one of the cam surfaces.

FIG. 8 is a perspective view of a portion of an alternate embodiment of the anchor of FIG. 1.

FIG. 9 is an axial sectional view of a portion of one jaws of the anchor of FIG. 8, taken along the line 9-9 of FIG. 8.

DETAILED DESCRIPTION OF THE DISCLOSURE

Figure 1:
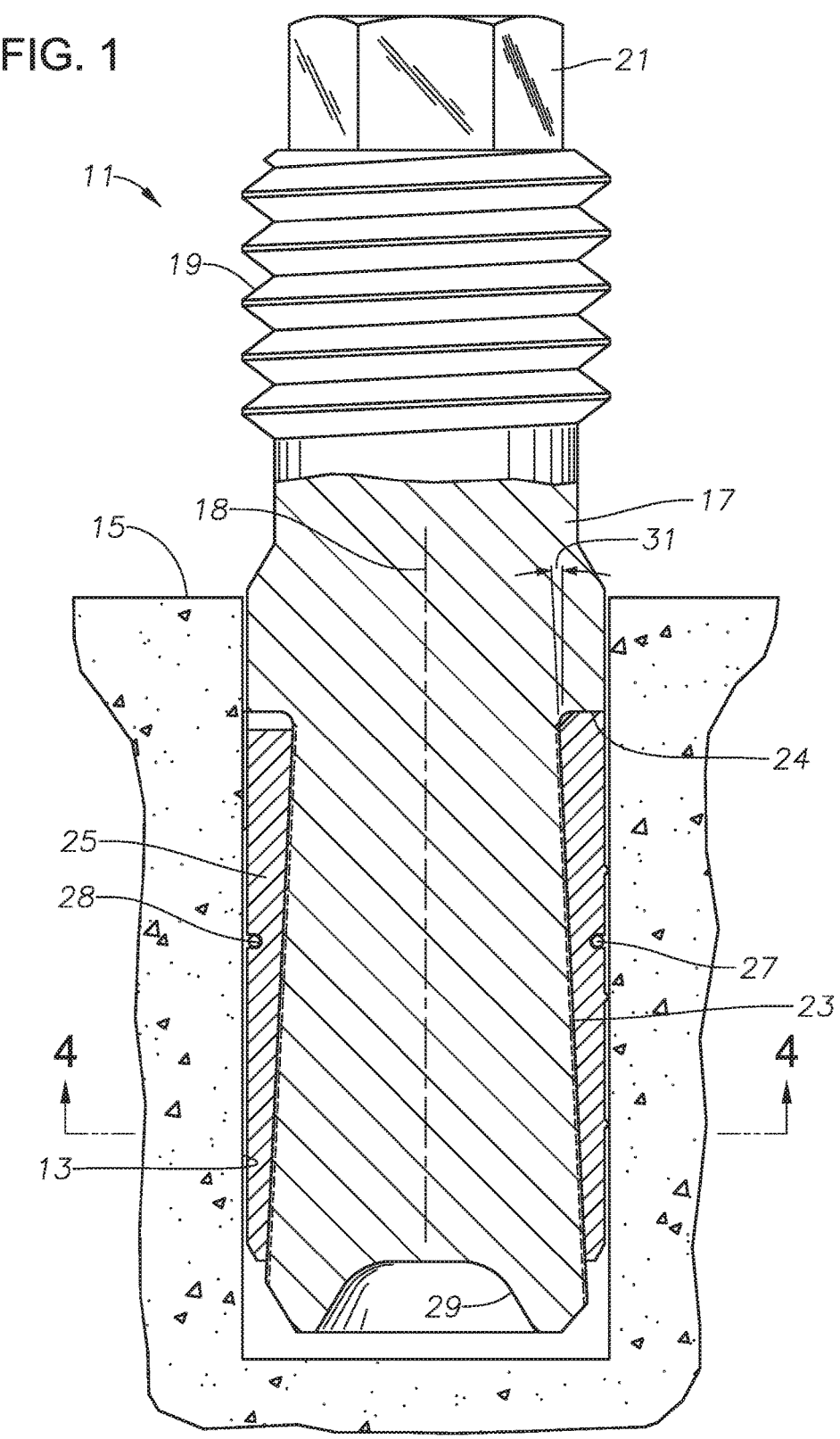
FIG. 1 is a vertical sectional view of an anchor in accordance with this disclosure.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1 an anchor 11 is illustrated in a hole 13 drilled in a concrete slab 15. Anchor 11 has a metal body 17 that has a lower portion rigidly installed in hole 13 and an upper portion protruding above slab 15. Body 17 has a longitudinal axis 18. The upper portion has a set of external threads 19 and a polygonal drive head 21 with drive flats located at the upper end. A building component, such as a bracket (not shown), slides over threads 19 to secure another building component, such as a stud (not shown) to slab 15. A nut (not shown) engages threads 19 to secure the building component. Drive head 21 has a smaller circumscribed outer diameter than threads 19. A tool (not shown), such as an air impact tool, engages the flats on drive head 21 to rotate body 17 during the installation in hole 13.

The lower portion of body 17 has a plurality of cam surfaces 23 (three in the embodiment shown). Cam surfaces 23 extend from near the lower end of body 17 upward to an external downward facing shoulder 24 that is recessed within hole 13 after installation. The outer diameter of body 17 at shoulder 24 is slightly smaller than the inner diameter of hole 13.

Anchor 11 has a jaw 25 for each cam surface 23. Jaws 25 move between a retracted position to an expanded position as body 17 rotates an increment relative to jaws 25. FIG. 1 shows an example of jaws 25 retained around the lower portion of body 17 with a split wire ring 27 located in a circumferentially extending groove 28 on the exterior of each jaw 25. Jaws 25 have upper ends that abut or are close to downward facing shoulder 24. Jaws 25 have lower ends that may be a short distance above the lower end of body 17. Body 17 may have a cavity or recess 29 on its lower end for accommodating debris that may be present in hole 13.

Cam surfaces 23 are located on a conical portion of body 17. In this example, cam surfaces 23 circumscribe an outer diameter at shoulder 24 that gradually increases in a downward direction to the lower ends of cam surfaces 23. A taper angle 31 from the lower end of cam surfaces 23 to downward facing shoulder 24 may be about three degrees relative to axis 18. Jaws 25 are radially thicker at their upper ends than at their lower ends to accommodate taper angle 31. That is, the radial dimension from the inner side to the outer side of each jaw 25 at any selected point decreases in a downward direction. The taper in thickness of jaws 25 matches taper angle 31 so that the outer diameter circumscribed by jaws 25 is substantially constant from the upper to the lower ends of jaws 25.

Figure 2:
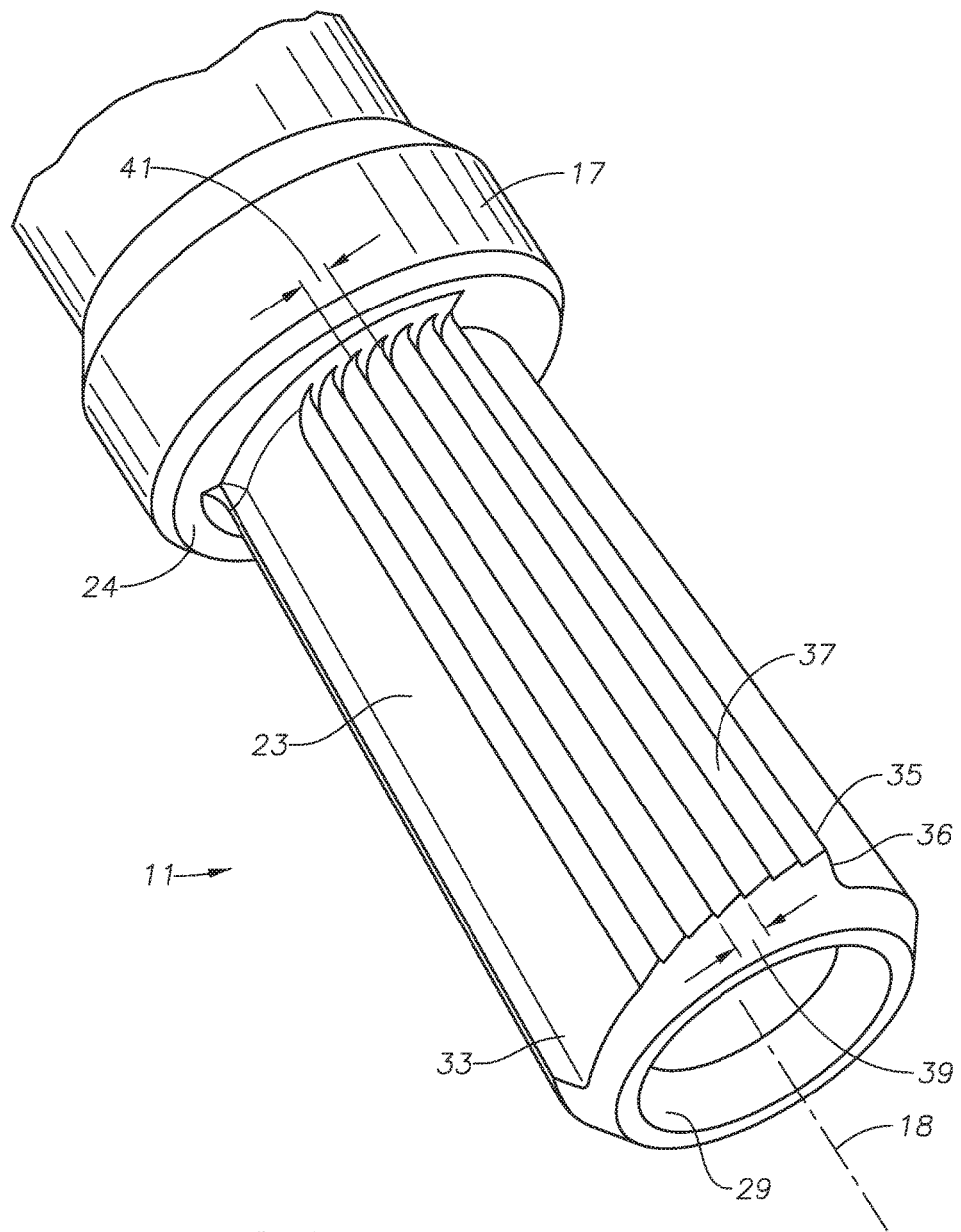
FIG. 2 is a perspective view of a lower portion of the anchor of FIG. 1, with the jaws removed.

Referring to FIG. 2, each cam surfaces 23 has a first edge 33 and a second edge 35 circumferentially spaced from first edge 33. Second edge 35 is farther from axis 18 than first edge 33. Each cam surface 23 curves outward in a helical fashion from first edge 33 to second edge 35. First edge 33 of each cam surface 23 begins at the second edge 35 of an adjacent one of the cam surfaces 23, defining a cam surface shoulder 36 that faces in a circumferential direction.

Each cam surface 23 has cam ratchet teeth 37 formed thereon so that cam surfaces 23 can rotate relative to jaws 25 (FIG. 1) an increment in only one direction. Cam ratchet teeth 37 may extend from the lower end of each cam surface 37 to the upper end at downward facing shoulder 24. Cam ratchet teeth 37 are side-by-side and join each other. In this embodiment, the set of cam ratchet teeth 37 does not extend circumferentially as far as the circumferential width of each cam surface 23. Rather, the set of cam ratchet teeth 37 begins on each cam surface 23 at a point circumferentially spaced from cam surface first edge 33. The set of cam ratchet teeth 37 ends at second edge 35 in this embodiment. The portion from cam surface first edge 33 to the first of the cam ratchet teeth 37 may remain smooth. That portion free of cam ratchet teeth 37 may vary in circumferential length, and is illustrated to be about one-half the circumferential extent of cam ratchet teeth 37.

Cam ratchet teeth 37 are generally saw toothed in configuration, each comprising a generally flat flank or surface. Because of taper angle 31 (FIG. 1), each cam ratchet tooth 37 decreases in width from a lower end width 39 to an upper end width 41 at the upper end adjacent downward facing shoulder 24.

Figure 3:
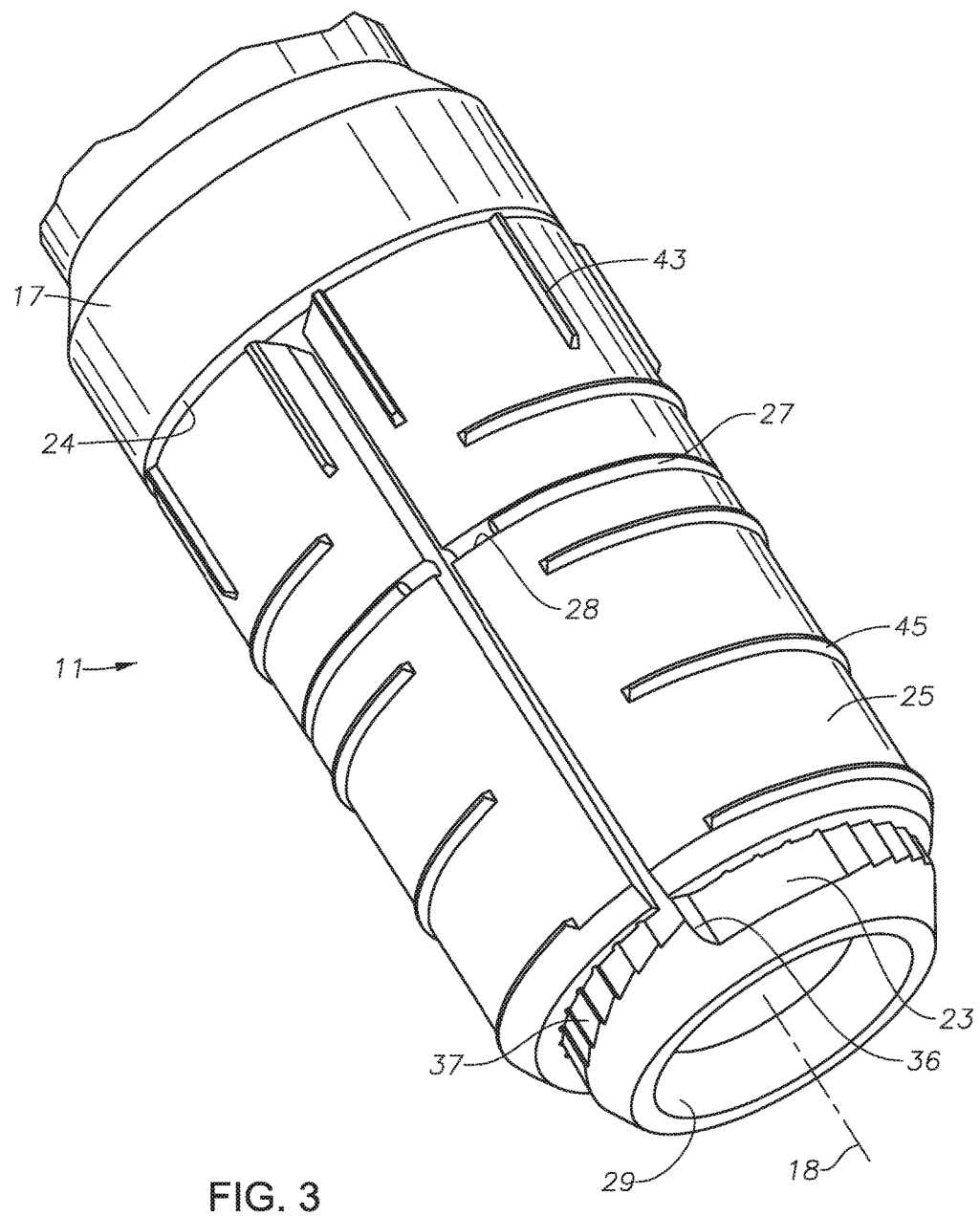
FIG. 3 is a perspective view similar to FIG. 2, but showing the jaws installed.

Referring to FIG. 3, each jaw 25 may have on its outer side protuberances to assist in gripping the sidewall of hole 13 in concrete slab 15 (FIG. 1). In this example, the protuberances include axially extending bands or ridges 43 and circumferentially extending bands or ribs 45. Axially extending ridges 43 are spaced circumferentially apart from each other on the outer side of each jaw 25. Axially extending ridges 43 are parallel to axis 18 and in this example, extend from the upper end of each jaw 25 to a point a short distance above the uppermost circumferentially extending rib 45. Circumferentially extending ribs 45 are in radial planes perpendicular to axis 18, and in this example, do not extend the full circumferential width of each jaw 25. Many other arrangements of protuberances to embed in the concrete to resist rotation and upward movement of anchor 11 are feasible, such as pyramidal protuberances, and the embodiment of FIGS. 8 and 9.

Referring to FIG. 4, each jaw 25 has jaw ratchet teeth 47 that mate with cam ratchet teeth 37 (FIG. 2). Jaw ratchet teeth 47 extend substantially the full length of each jaw 25. Jaw ratchet teeth 47 are located on the inner side of each jaw 25 in a set extending from a first side edge 49 of jaw 25 to a second side edge 50. Jaw ratchet teeth 47 ratchet on cam ratchet teeth 37 (FIG. 2) as anchor body 17 rotates relative to jaws 25. The engagement of jaw ratchet teeth 47 with cam ratchet teeth 37 allows cam surfaces 23 (FIG. 2) to rotate an increment in one direction relative to jaws 25, but not the reverse direction.

Each jaw 25 gradually decreases in thickness from first side edge 49 to second side edge 50. The thickness is measured from the outer side to the inner side of each jaw 25. The taper in thickness matches the contour of each cam surface 23.

Referring to FIG. 5, each cam ratchet tooth 37 is preferably located in a single, flat plane that extends from a crest 51 on one side edge of tooth 37 to a root 53 on the other side edge. Crest 51 is farther from axis 18 (FIG. 2) than root 53. Crest 51 on one cam ratchet tooth 37 joins root 53 of an adjacent cam ratchet tooth 37. The junction of root 53 and crest 51 results in a shoulder 52 that faces in an opposite direction to the rotation of body 17, as illustrated by the arrow in FIG. 5. A radial line of axis 18 (FIG. 2) passes through each cam ratchet tooth 37 at an angle other than 90 degrees.

Referring also to FIG. 4, a longitudinally extending groove 55 separates each jaw ratchet tooth 47 from adjacent jaw ratchet teeth 47 on each side. Grooves 55 extend the full length of jaw teeth 47. As shown in FIG. 5, each groove 55 is rounded at its base. Each jaw ratchet tooth 47 extends from one groove 55 to an adjacent groove 55. Each jaw ratchet tooth 47 has a crest 57 joining one groove 55 and a root 58 joining an adjacent groove 55. Jaw tooth crest 57 is closer to axis 18 (FIG. 2) than jaw root 58. Because of grooves 55, the width of each jaw ratchet tooth 47 measured from jaw root 58 to jaw crest 57 is less than the width of each cam ratchet tooth 37. The junction of each jaw tooth crest 57 with an adjacent jaw tooth root 58 defines a jaw tooth shoulder 56 that faces in a circumferential direction opposite to cam ratchet teeth shoulders 52.

In the position shown in FIG. 5, each cam ratchet tooth shoulder 52 abuts one of the jaw tooth shoulders 56, preventing body 17 from rotating relative to jaws 25 in a loosening direction opposite to the arrow of FIG. 5. In the position shown in FIG. 5, each cam ratchet tooth 37 is in flush, parallel engagement with one of the jaw ratchet teeth 47.

Figure 6:
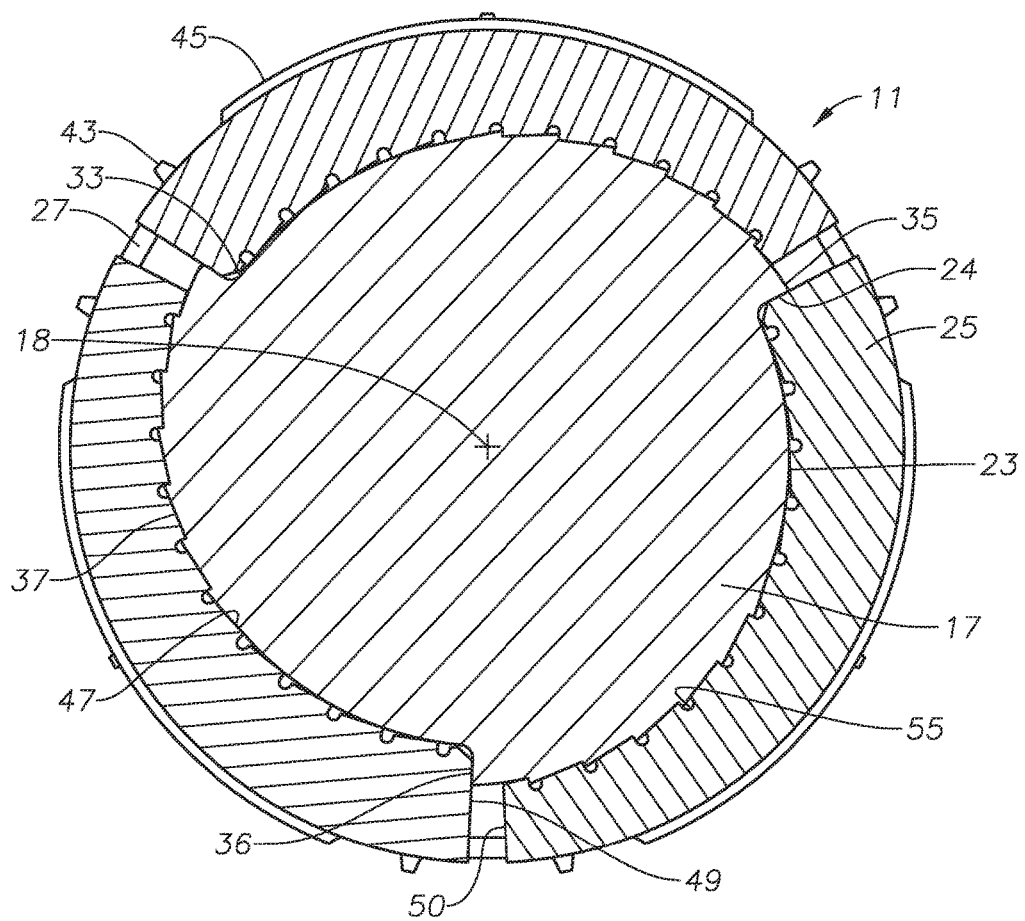
FIG. 6 is a sectional view of the anchor of FIG. 1 taken along the line 4-4 of FIG. 1, and showing the jaws retracted.

In operation, a technician assembles jaws 25 around body 17, as shown in FIG. 1. Jaws 25 will be in a retracted position, with the outer diameter circumscribed by jaws 25 being approximately the same as the outer diameter of body shoulder 24. As shown in FIG. 6, while in the retracted position, shoulder 36 of each cam surface 23 will be in abutment with the jaw first side edge 49 of one of the jaws 25. The technician inserts the lower portion of stud anchor 11 into hole 13. The technician couples a tool, such as an air impact tool, to drive head 21, then rotates body 17 in a desired direction, which is clockwise when viewed from above. The axial protuberances 43 on jaws 25 may be in frictional engagement with the side wall of hole 13 before body 17 begins to rotate, tending to prevent jaws 25 from rotating with body 17 even while jaws 25 are in the retracted position.

Figure 7:
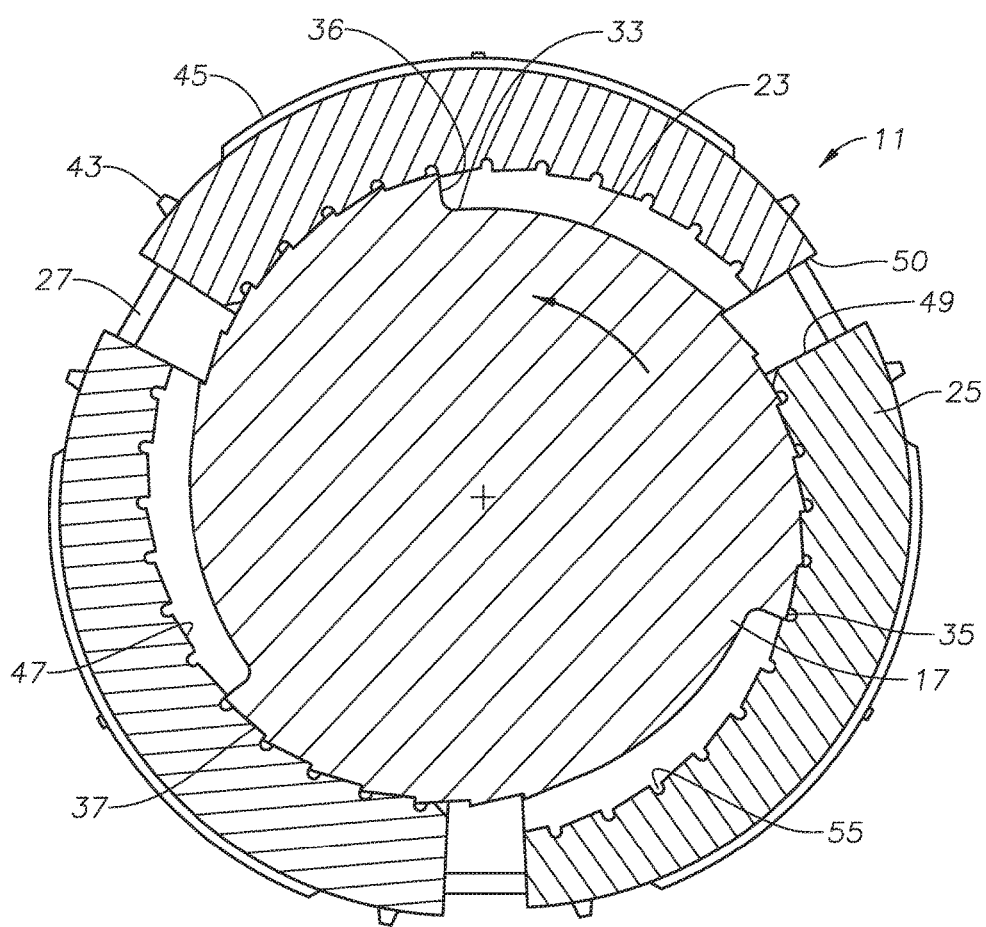
FIG. 7 is a sectional view similar to FIG. 4, but showing the jaws in an expanded position

As shown by the arrow in FIG. 7, anchor body 17 will begin to rotate relative to jaws 25. Cam surface shoulders 36 move circumferentially away from jaw thicker side edges 49. The relative rotation causes the outer diameter circumscribed by jaws 25 to increase. Jaw side edges 49, 50 move farther apart from each other. Protuberances 43, 45 will embed into the side wall of hole 13 (FIG. 1).

As cam surfaces 23 rotate relative to jaws 25, jaw ratchet teeth 47 will ratchet on cam ratchet teeth 37; the ratcheting causing slight inward and outward movement of jaws 25 relative to axis 18. After an increment of relative rotation, illustrated to be about 45-60 degrees, jaws 25 can expand no more because of tight engagement with the side wall of hole 13.

At that point, anchor body 17 can no longer rotate in the direction indicated by the arrow in FIG. 7. Several of the cam ratchet teeth 37 will be flush with jaw ratchet teeth 47. Several cam ratchet teeth shoulders 52 will be in abutment with jaw teeth shoulders 56, preventing relative rotation in a direction opposite to the arrow of FIG. 7. Consequently, vibration and the like will not cause relative movement in the retracting direction. A portion of each jaw 25 will have moved out of sliding engagement with its mating cam surface 23 while fully expanded, as shown in FIG. 7. Jaw teeth 47 on that portion will be spaced radially outward from the adjacent cam surface 23 by a gap.

Figure 10:
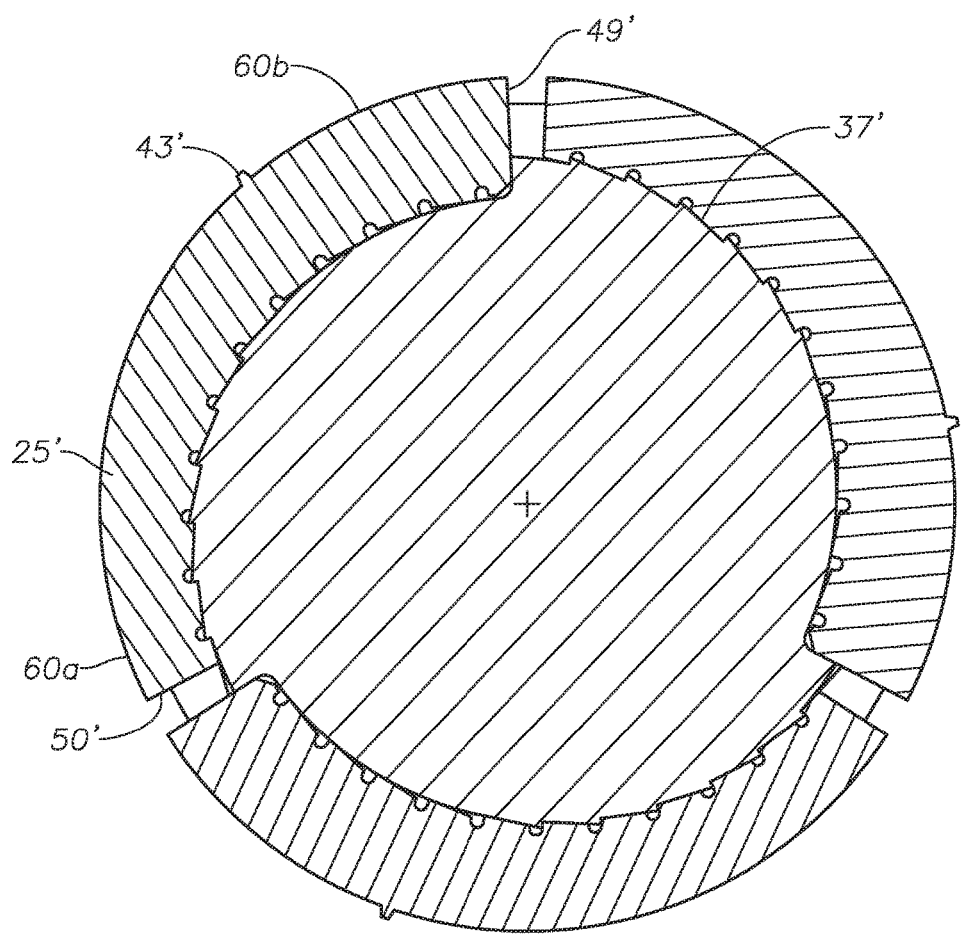
FIG. 10 is a sectional view of the anchor of FIG. 8, taken along the line 10-10 of FIG. 8.

In FIGS. 8-10, features that are the same or similar to the first embodiment are illustrated with the same numerals and a prime symbol. There are more circumferential bands or ribs 45' than ribs 45 of the first embodiment. Ribs 45' are in an array extending the full length of the outer side of each jaw 25'. A conical tapered surface 25a' is formed on the lower end of each jaw 25' to facilitate entry into a hole. In this embodiment, the axial length of each jaw 25' is less than the axial length of each set of cam ratchet teeth 37'. A lower portion of each set of cam ratchet teeth 37' protrudes below the lower end of each jaw 25'. Also, protuberances 43' are located on each rib 45' rather than being located above ribs 45'.

Referring to FIG. 9, ribs 45' are generally saw-toothed in shape to resist upward movement once anchor 11' is set in a concrete hole. Each rib 45' has a conical upper flank 45a' and a conical lower flank 45b' joined by a cylindrical crest 45c'. Upper flank 45a' is more inclined relative to the axis of anchor 11' than lower flank 45c'. Upper and lower flanks 45a', 45b' define a recess or groove separating each crest 45c' from the crest 45c' immediately above and the crest 45c' immediately below.

A protuberance 43' is located on each crest 45c', and the grooves formed by flanks 45a', 45b' separate each protuberance 43' from one located immediately above and one located immediately below. Protuberances 43' are located one above other in a vertical row extending the full length of the array of ribs 45'. The circumferential width of each protuberance 43' is much less than the circumferential length of each rib 45'.

Referring to FIG. 10, in this example, the radially thinner side edge 50' of each jaw 25' has an outer side portion 60a that is formed at a lesser radius than the remaining outer side portion 60b that joins thicker side edge 49'. As a result, a ratio of the thickness of thinner side edge 50' to thicker side edge 49' is smaller than in the first embodiment. Protuberances 43' are located on outer side portion 60b at a portion of maximum thickness of jaw 25'.

Figure 11:
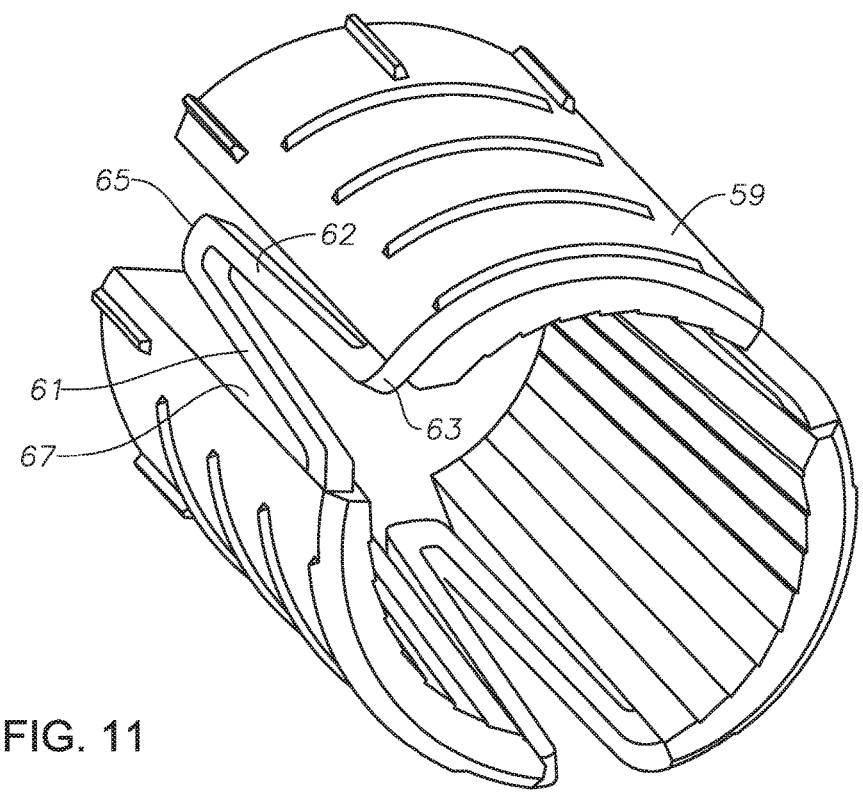
FIG. 11 is a perspective view of an alternate embodiment for retaining the jaws around the lower portion of the anchor.

FIG. 11 shows an alternate arrangement for retaining jaws 59 around cam surfaces 23 (FIG. 2). Instead of wire spring 27 (FIG. 1), a flexible linking member 61 joins adjacent jaws 59. Linking member 61 may have various configurations, and in this example, it is generally U-shaped with two legs 62 having ends 63. A curved bight 65 is at the opposite ends of legs 62. Each end 63 is rigidly joined to or formed with one of the jaw side edges 67. One method of joining would be to die cast linking members 61 with jaws 59. Jaws 59 and linking members 61 may be formed of a zinc material. The distance from ends 63 to bight 65 is almost the length of jaws 59, allow legs 62 of linking members 61 to flex apart as jaw side edges 67 move apart from each other.

Figure 12:
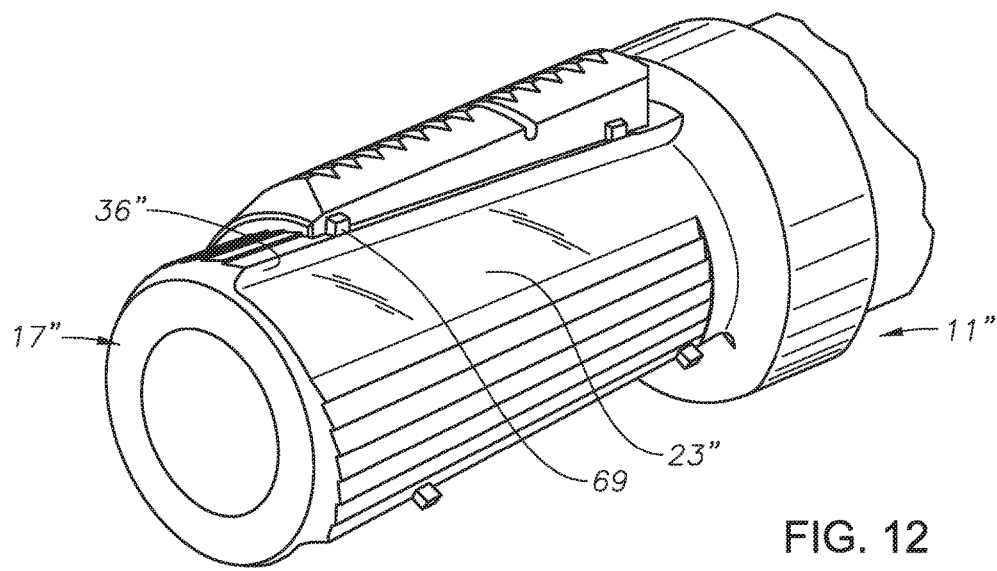
FIG. 12 is a perspective view of an alternate embodiment employing frangible tabs on the cam surfaces.

FIG. 12 illustrates another embodiment. Jaws 25" are the same as in the embodiment of FIGS. 8-10. Cam surfaces 23" are the same except with the addition of at least one frangible tab 69 (two shown) integrally formed on each cam surface 23. Tabs 69 are spaced apart and located at the outer edge of each shoulder 36". When jaws 25" are assembled on cam surfaces 23", tabs 69 will be located between opposing side edges 49" and 50" of adjacent jaws 25". Tabs 69 have a lesser radial dimension than the radial thickness of the part of each side edge 49", 50" that they abut.

Tabs 69 will initially prevent any rotation of body 17" relative to jaws 25", preventing inadvertent anchoring of anchor 11" as it is being inserted into a hole. After full insertion, the operator will begin to rotate body 17". The protuberances 43' (FIG. 10) on jaws 25" engage the wall of the hole, tending to prevent any rotation of jaws 25". The rotational force on body 17" will result in a torque being applied to tabs 69. When a threshold level of torque is reached, tabs 69 shear, enabling body 17" to rotate an increment relative to jaws 25". As jaws 25" slide along cam surfaces 23", they will tightly grip the side wall of the hole.

The present invention described herein, therefore, is well adapted to carry out the objects and attain the ends and advantages mentioned, as well as others inherent therein. While a few embodiments of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims. For example, the device disclosed may be modified to have other uses than as an anchor.

The invention claimed is:

1. A device for securing within and protruding from a hole, comprising:
    a body having a lower portion, an upper portion, and a longitudinal axis;
    a downward facing shoulder at a junction of the upper portion with the lower portion;
    a plurality of cam surfaces formed on the lower portion of the body, each of the cam surfaces curving outward from a first edge at a first radial distance to a second edge at a second radial distance relative to the axis that is greater than the first radial distance, each of the cam surfaces having an upper end adjacent the downward facing shoulder;
    the cam surfaces having a circumscribed outer diameter that increases in a downward direction from the downward facing shoulder;
    a plurality of jaws retained around the lower portion, each of the jaws having an inner side in engagement with one of the cam surfaces, each of the jaws decreasing in radial thickness from the inner side to an outer side measured from an upper end to a lower end of each of the jaws, defining a circumscribed outer diameter for the jaws that is the same from the upper ends to the lower ends of the jaws; and wherein
    an increment of rotation of the body in a first direction relative to the jaws causes the circumscribed outer diameter of the jaws to increase and the jaws to move from a retracted to an expanded position, enabling the jaws to grip a sidewall of the hole.

2. The device according to claim 1, wherein the body has an outer diameter at the downward facing shoulder that is the same as the circumscribed outer diameter of the jaws while the jaws are in the retracted position.

3. The device according to claim 1, further comprising:
    a tab protruding from each cam surface and initially located between opposing side edges of adjacent ones of the jaws while the jaws are in the retracted position; and
    wherein the tabs are configured to shear at a threshold torque, enabling the jaws to move to the expanded position.

4. The device according to claim 1, further comprising:
    at least one axially extending ridge protruding from the outer side of each of the jaws; and
    at least one circumferentially extending ridge protruding from the outer side of each of the jaws.

5. The device according to claim 1, further comprising:
    an array of circumferentially extending ribs protruding from the outer side of each of the jaws, each of the ribs having an upward facing flank and a downward facing flank joined by a crest, the upward facing flank inclining more relative to the axis than the downward facing flank.

6. The device according to claim 1, further comprising:
    an array of circumferentially extending ribs on the outer side of each of the jaws, each of the ribs being separated from adjacent ribs above and below by grooves; and
    a protuberance protruding from each of the ribs and having a lesser circumferential dimension than a circumferential length of each of the ribs.

7. The device according to claim 1, further comprising:
    a set of threads formed on the upper portion of the body; and
    a polygonal drive head formed on the upper portion of the body.

8. The device according to claim 1, further comprising:
    a set of cam ratchet teeth formed on each of the cam surfaces; and
    a set of jaw ratchet teeth formed on the inner side of each of the jaws, the jaw ratchet teeth configured to engage and ratchet over the cam ratchet teeth as the body rotates from the retracted to the expanded position, the engagement of the cam and jaw ratchet teeth preventing rotation of the body relative to the jaws from the expanded position to the retracted position.

9. The device according to claim 1, further comprising an expansible ring encircling the jaws to retain the jaws on the body.

10. The device according to claim 1, further comprising:
    an expansible linking member joining side edges of the jaws to each other.

11. A device for securing within and protruding from a hole, comprising:
    a body having a lower portion, an upper portion, and a longitudinal axis;
    a plurality of cam surfaces around an exterior of the lower portion of the body, each of the cam surfaces curving outward from a first edge at a first radial distance to a second edge at a second radial distance relative to the axis that is greater than the first radial distance;
    a plurality of jaws retained around the lower portion, each of the jaws having an inner side in engagement with one of the cam surfaces, such that an increment of rotation of the body in a first direction relative to the jaws causes the jaws to move from a retracted position to an expanded position, enabling the jaws to grip a sidewall of the hole;
    a set of cam ratchet teeth formed on each of the cam surfaces; and
    a set of jaw ratchet teeth formed on the inner side of each of the jaws, the jaw ratchet teeth configured to engage and ratchet over the cam ratchet teeth as the body rotates in the first direction, the engagement of the cam and jaw ratchet teeth preventing rotation of the body relative to the jaws in a second direction.

12. The device according to claim 11, wherein:
    the cam surfaces circumscribe an outer diameter that increases from an upper end to a lower end of the cam surfaces; and
    each of the jaws decreases in radial thickness from an upper end to a lower end of each of the jaws.

13. The device according to claim 11, wherein:
    the set of cam ratchet teeth on each of the cam surfaces has a first edge at a selected circumferential distance from the first edge of each of the cam surfaces and a second edge at the second edge of each of the cam surfaces, defining a circumferential smooth portion on each of the cam surfaces from the first edge of each of the cam surfaces to the first edge of the cam ratchet teeth.

14. The device according to claim 13, wherein:
a circumferential length of the set of jaw ratchet teeth on each of the jaws is greater than a circumferential length of the set of cam ratchet teeth on each of the cam surface;
while in the retracted position, a portion of the set of jaw ratchet teeth on each of the jaws overlies the smooth portion on one of the cam surfaces; and
while in the expanded position, a portion of the set of jaw ratchet teeth of each of the jaws will be out of engagement with the cam ratchet teeth on said one of the cam surfaces.

15. The device according to claim 11, wherein:
each of the cam ratchet teeth is flat from one side edge to an opposite side edge of each of the cam ratchet teeth.

16. The device according to claim 11, further comprising:
a plurality of grooves extending from an upper end to a lower end of each of the sets of jaw ratchet teeth, each of the grooves separating each of the jaw ratchet teeth from adjacent ones of the jaw ratchet teeth; and
wherein each of the grooves defines a circumferentially facing shoulder that faces into the second direction.

17. A device for securing within and protruding from a hole, comprising:
a body having a lower portion, an upper portion, and a longitudinal axis;
a downward facing shoulder at a junction of the upper portion with the lower portion;
a plurality of cam surfaces formed on the lower portion of the body, each of the cam surfaces curving outward from a first edge at a first radial distance to a second edge at a second radial distance relative to the axis that is greater than the first radial distance, each of the cam surfaces having an upper end adjacent the downward facing shoulder;
the cam surfaces having a circumscribed outer diameter that increases in a downward direction from the downward facing shoulder;
a plurality of jaws retained around the lower portion, each of the jaws having an inner side in engagement with one of the cam surfaces, each of the jaws decreasing in radial thickness from the inner side to an outer side measured from an upper end to a lower end of each of the jaws, defining a circumscribed outer diameter for the jaws that is the same from the upper ends to the lower ends of the jaws;
a set of cam ratchet teeth formed on each of the cam surfaces; and
a set of jaw ratchet teeth formed on the inner side of each of the jaws, the jaw ratchet teeth configured to engage and ratchet over the cam ratchet teeth as the body rotates in a first direction to move the jaws from a contracted position to an expanded position, the engagement of the cam and jaw ratchet teeth preventing rotation of the body relative to the jaws in a second direction from the expanded position to the contracted position.

18. The device according to claim 17, further comprising:
a plurality of grooves extending from an upper end to a lower end of each of the sets of jaw ratchet teeth, each of the grooves separating each of the jaw ratchet teeth from adjacent ones of the jaw ratchet teeth; and
wherein each of the grooves defines a circumferentially facing shoulder that faces into the second direction.

19. The device according to claim 17, wherein:
each of the cam ratchet teeth is flat from one side edge to an opposite side edge of each of the cam ratchet teeth.

20. The device according to claim 17, further comprising:
a tab protruding from each cam surface and initially located between opposing side edges of adjacent ones of the jaws while the jaws are in the contracted position; and
wherein the tabs are configured to shear from the body at a threshold torque to enable the jaws to move to the expanded position.

* * * * *